(12) United States Patent
Kukoleca et al.

(10) Patent No.: US 7,716,359 B2
(45) Date of Patent: May 11, 2010

(54) METHOD AND SYSTEM FOR PROVIDING AN INTERFACE THROUGH WHICH AN APPLICATION CAN ACCESS A MEDIA STACK

(75) Inventors: Dalibor Kukoleca, Redmond, WA (US); Wei Zhong, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1044 days.

(21) Appl. No.: 11/124,902

(22) Filed: May 9, 2005

(65) Prior Publication Data

US 2006/0251095 A1 Nov. 9, 2006

(51) Int. Cl.
*G06F 15/16* (2006.01)

(52) U.S. Cl. .................. 709/231; 709/201; 709/203; 709/204; 709/206; 709/221; 370/229; 370/353; 370/536

(58) Field of Classification Search .......... 709/231, 709/203, 204, 206, 221; 370/229, 353, 536
See application file for complete search history.

(56) References Cited

U.S. PATENT DOCUMENTS

| | | | | |
|---|---|---|---|---|
| 4,872,160 A | * | 10/1989 | Hemmady et al. | 370/353 |
| 5,515,508 A | * | 5/1996 | Pettus et al. | 709/203 |
| 5,568,614 A | * | 10/1996 | Mendelson et al. | 709/231 |
| 5,937,328 A | * | 8/1999 | Park et al. | 725/67 |
| 5,999,964 A | * | 12/1999 | Murakata et al. | 709/201 |
| 6,842,772 B1 | * | 1/2005 | Delaney et al. | 709/206 |
| 6,901,474 B2 | * | 5/2005 | Lym et al. | 710/305 |
| 7,289,716 B2 | * | 10/2007 | Gates et al. | 386/46 |
| 2001/0044851 A1 | * | 11/2001 | Rothman et al. | 709/231 |
| 2003/0187910 A1 | * | 10/2003 | Furukawa et al. | 709/104 |
| 2005/0262254 A1 | * | 11/2005 | Sherwani | 709/231 |

OTHER PUBLICATIONS

U.S. Appl. No. 11/124,911, filed May 9, 2005, Kukoleca.

* cited by examiner

*Primary Examiner*—Rupal D Dharia
*Assistant Examiner*—Hua Fan
(74) *Attorney, Agent, or Firm*—Perkins Coie LLP (57) ABSTRACT

A communications system provides a media sender object and a media receiver object that provide an interface between a media stack and an application. The application can use the media sender object to send content to a source media stack and the media receiver object to receive content from a sink media stack. The application programming interface of the media sender object and the media receiver object provides functions for registering and un-registering buffers for storing and receiving content. When a source media stack is ready to send content, it invokes each registered source to collect content to be sent. When a sink media stack has received content, it invokes each registered sink to provide the received content. An application interfaces with a media sender object and a media receiver object to add content to a channel or to receive content from a channel.

19 Claims, 7 Drawing Sheets

METHOD AND SYSTEM FOR PROVIDING AN INTERFACE THROUGH WHICH AN APPLICATION CAN ACCESS A MEDIA STACK

CROSS-REFERENCE TO RELATED APPLICATION(S)

This application is related to U.S. patent application Ser. No. 11/124,911, filed May 9, 2005, entitled "Method and System for Generating a Routing Table for a Conference," and filed concurrently, now U.S. Pat. No. 7,593,986 issued on Sep. 22, 2009, which is hereby incorporated by reference.

TECHNICAL FIELD

The described technology relates generally to communication systems and particularly to communicating via a channel having a media stack.

BACKGROUND

Video conferencing allows conference participants who are at different locations to participate in a conference. Typically, each conference participant has a computer-based video conferencing system that includes a video camera, a microphone, a display device, and a speaker. The video conferencing system of a conference participant captures the video and audio of that conference participant using the video camera and microphone and transmits the video and audio to the video conferencing systems of the other conference participants. When a video conferencing system receives the video and audio from the other conference participants, it presents the video on the display device and outputs the audio to the speaker. A video conferencing system may display each video in a different window on the display device or in a different area of a window. Thus, the conference participants can view the video and hear the audio of the other conference participants.

To support video and audio conferencing, the participant computer systems need to be interconnected in some way. Each connection has a video channel and an audio channel between participant computer systems. Each channel includes a send stream and a receive stream for sending and receiving content of the channel. Each endpoint of a channel includes a source and a sink that are connected to the streams of the channel. For example, the source and the sink of an audio channel are microphones and speakers, respectively. For both streams of an audio channel, a microphone is connected at one endpoint and a speaker is connected at the other endpoint.

Each endpoint of each stream of a channel may have a media stack of components that implement the functions of the stream. The components of the media stack of an audio channel for a source may receive audio content in PCM format, convert the audio content from PCM format to G.722 format, packetize the audio content that is in the G.722 format, and transmit the packetized content to the sink at the other endpoint. The components of a media stack of an audio channel for a sink may receive packetized audio content from the source at the other endpoint, de-packetize the received content, convert the de-packetized content from G.722 format to PCM format, and provide the content in PCM format to the local sink.

The existing channel structure allows only actual devices (e.g., microphones and speakers) to be sources and sinks of a channel. If, for example, a developer wants to intercept and record the content that is received at the sink, then the sink device driver will need to be modified to perform the intercepting and recording. In addition, if a developer wants to provide additional content not provided by a device, then the developer will also need to modify a source device driver. Each developer who wants to provide additional functions will need to modify the drivers accordingly. It would be desirable to have a technique that would allow for the intercepting of content and providing of content in a uniform manner to make it easier for developers to intercept content and provide additional content.

SUMMARY

A communications system provides a media sender object and a media receiver object that provide an interface between a media stack and an application. The application can use the media sender object to send content to a source media stack and the media receiver object to receive content from a sink media stack. The application programming interface of the media sender object and the media receiver object provides functions for registering and un-registering buffers for storing and receiving content. When a source media stack is ready to send content, it invokes each registered source to collect content to be sent. When a sink media stack has received content, it invokes each registered sink to provide the received content. An application interfaces with a media sender object and a media receiver object to add content to a channel or to receive content from a channel.

DETAILED DESCRIPTION

A method and system for interfacing with a media stack in a uniform manner is provided. In one embodiment, a communications system provides a media sender object and a media receiver object that provide an interface between a media stack and an application. The application can use the media sender object to send content to a source media stack and the media receiver object to receive content from a sink media stack. The media objects provide a uniform interface for the application and for the media stack. The application programming interface of the media sender object and the media receiver object provides functions for registering and un-registering buffers for storing and receiving content. The buffers may be represented by a media buffer object. An application that is to send and receive content registers buffers containing the content with a media sender object and registers buffers to receive the content with a media receiver object. When a media object has completed its use of a buffer, it signals the application. If the buffer contains received content, the application can then access the content of the buffer. If the buffer contains content that was sent, then the application can reuse the buffer when sending additional content. An application registers media sender objects and media receiver objects with the streams of a channel. Drivers of actual devices also register with a media stack. Media sender objects and media receiver objects may be considered to be virtual sources and sinks, and drivers for actual devices may be considered to be non-virtual sources and sinks. The media stack provides the channels with the opportunity to send or receive content. When a channel is ready to send content, it invokes each registered source to collect content to be sent. When a channel has received content, it invokes each registered sink to provide the received content. An application interfaces with a media sender object and a media receiver object to add content to a channel or to receive content from a channel. For example, an application may provide background music to an audio channel using a media sender object and may intercept and archive the content of the audio channel using a media receiver object. In this way, applications can use a common interface to interface with the media stack of a channel.

Tables 1A, 1B, 2A, 2B, 3A, and 3C list the methods and properties of the application programming interface ("API") for the media sender object, the media receiver object, and the media buffer object in one embodiment. Tables 1A and 1B list the methods and properties of the media sender object. The media sender object provides methods for enqueueing media buffer objects containing content to be sent and dequeueing media buffer objects whose content has already been sent, canceling queued media buffer objects, and activating and deactivating the functions of the media sender object. The media sender object provides properties indicating status of the current, pending, and completed media buffers, threshold specifications, and media formats. The threshold specifications indicate a threshold mode and a threshold used by the media sender object to notify an application via an event when the threshold of that threshold mode is reached. The application can set the threshold mode to the remaining bytes (i.e., that have not yet been sent) in the pending media buffer objects, remaining pending media buffer objects, or remaining bytes in the current media buffer object. When the application-defined threshold is reached for the application-defined threshold mode, then the media sender object sets an event to notify the application.

TABLE 1A

Media Sender Object--Methods

| Method | Description |
| --- | --- |
| Activate( ) | Start sending content of the media buffer objects in the media buffer queue and enable events |
| Deactivate( ) | Stop sending content of the media buffer objects and disable events |
| CancelCurrentBuffer( ) | Stop sending content of the current media buffer object; the media sender object will start sending content of the next media buffer object and set a buffer completion event for the canceled media buffer object |
| CancelAllPendingBuffers( ) | Stop sending content of the current and pending media buffer objects; the media sender object will set buffer completion events for the canceled media buffer objects |
| EnqueueBuffer(RtpMediaBuffer buffer) | Add the passed media buffer object onto the end of the media buffer queue |
| RtpMediaBuffer DequeueCompleteBuffer( ) | Remove the next completed media buffer object from the media buffer queue and return a reference to the media buffer object |

TABLE 1B

Media Sender Object--Properties

| Property | Description |
| --- | --- |
| NumberOfPendingBuffers | Number of media buffer objects in the media buffer queue that are not completed |
| NumberOfPendingBytes | Number of bytes in the pending media buffer objects that have not yet been sent |
| CurrentPendingBuffer | Reference to media buffer object whose data is currently being sent |
| NumberOfCompletedBuffers | Number of media buffer objects in the media buffer queue that are completed |

TABLE 1B-continued

Media Sender Object--Properties

| Property | Description |
|---|---|
| NumberOfCompletedBytes | Number of bytes in the completed media buffer objects |
| FirstCompletedBuffer | Reference to first completed media buffer object |
| BufferThreshold | Threshold for event notification |
| BufferThresholdMode | Type of threshold for threshold event notification: number of remaining bytes in the pending media buffer objects, number of pending media buffer objects, or number of bytes remaining in the current media buffer object |
| BufferThresholdEvent | Event that is set when the buffer threshold is satisfied |
| BufferCompletedEvent | Event that is set upon completion of sending the data of the current media buffer object |
| IsActive | Flag indicating whether the media sender object is active |
| MixMediaSender | Flag indicating whether the data of the media sender object is to be mixed |
| VideoFormat | Format of the video of the media sender object such as IYUV and YUY2 |
| VideoSize | Size of the video such as VGA and CIF |
| TargetFramesPerSecond | Number of frames per second to be sent |
| FramesPerSecond | Number of frames per second actually sent |
| AudioFormat | Format of the audio of the media sender object such as PCM16K and PCM8K |
| Volume | Percent of supplied volume |
| NormalizeAudioForMixer | Flag indicating whether to normalize audio for mixer |
| DetectSignalLevel | Flag indicating whether the signal level is to be detected |
| CompressAudio | Percent to stretch or compress the audio |
| SignalLevel | Signal level of PCM16K |

Tables 2A and 2B list the methods and properties of the media receiver object. The media receiver object provides methods for enqueueing media buffer objects for storing content that is to be received and dequeueing media buffer objects that contain received content, canceling queued media buffer objects, and activating and deactivating the functions of the media receiver object. The media receiver object provides properties indicating status of the current, pending, and completed media buffer objects, threshold specifications, and media formats. The threshold specifications indicate the threshold mode and threshold used by the media sender object to notify an application via an event when the threshold of the threshold mode is reached. The application can set the threshold mode to the remaining bytes (i.e., bytes that do not yet have content stored in them) in the pending media buffer objects, remaining pending media buffer objects, or remaining bytes in the current media buffer object. When the application-defined threshold is reached for the application-defined threshold mode, then the media sender object sets an event to notify the application.

TABLE 2A

Media Receiver Object--Methods

| Method | Description |
|---|---|
| Activate( ) | Start receiving content into the media buffer objects in the media buffer queue and enable events |
| Deactivate( ) | Stop receiving content into the media buffer objects in the media buffer queue and disable events |
| CancelCurrentBuffer( ) | Stop receiving content into the current media buffer object; the media receiver object will start receiving content into the next media buffer object and set a completion event for the canceled media buffer object |
| CancelAllPendingBuffers( ) | Stop receiving content into the current and pending media buffer objects; the media receiver object will set completion events for the canceled media buffer objects |
| EnqueueBuffer(RtpMediaBuffer buffer) | Add the passed media buffer object onto the end of media buffer queue |
| RtpMediaBuffer DequeueCompletedBuffer( ) | Remove the next completed media buffer object from the media buffer queue and return a reference to the media buffer object |

TABLE 2B

Media Receiver Object--Properties

| Property | Description |
| --- | --- |
| NumberOfPendingBuffers | Number of media buffer objects in the media buffer queue that are not completed |
| NumberOfPendingBytes | Number of bytes in the pending media buffer objects that have not yet received data |
| CurrentPendingBuffer | Reference to media buffer object that is currently receiving data |
| NumberOfCompletedBuffers | Number of media buffer objects in the media buffer queue that are completed |
| NumberOfCompletedBytes | Number of bytes in the completed media buffer objects |
| FirstCompletedBuffer | Reference to first completed media buffer object |
| BufferThreshold | Threshold for event notification |
| RtpMediaBufferThresholdMode | Type of threshold for threshold event notification: number of remaining bytes in the pending media buffer objects, number of pending media buffer objects, or number of bytes remaining in the current media buffer object |
| BufferThresholdEvent | Event that is set when the buffer threshold is satisfied |
| BufferCompletedEvent | Event that is set upon completion of receiving data into the current media buffer object |
| IsActive | Flag indicating whether the media sender object is active |
| VideoFormat | Format of the video of the media sender object |
| AudioFormat | Format of the audio of the media sender object |

Tables 3A and 3B list the methods and properties of the media buffer object. The media buffer object provides methods for setting the length of an allocated media buffer and for copying media buffers between managed and unmanaged memory. The media buffer objects provide properties for the media buffer such as the allocated length and processed length.

TABLE 3A

Media Buffer Object--Methods

| Method | Description |
| --- | --- |
| RtpMediaBuffer(int bufferlength) | Sets the length of the media buffer to be allocated |
| Int UnmanagedCopy(int start, int length, void *buffer) | Copies from the passed buffer of unmanaged memory into the media buffer in managed memory |
| Int UnmanagedCopyIn(int rtpBufferOffset, void *buffer, int offset, int length) | Copies from the passed buffer of unmanaged memory into the media buffer at buffer offset in managed memory |
| Int UnmanagedCopyOut(int rtpBufferOffset, void *buffer, int offset, int length) | Copies to the passed buffer of unmanaged memory from the media buffer at buffer offset in managed memory |

TABLE 3B

Media Buffer Object--Properties

| Property | Description |
| --- | --- |
| Buffer | Reference to media buffer |
| AllocatedLength | Length of media buffer |
| UsedLength | Length of media buffer used |
| ProcessedLength | Length of media buffer that has been processed |
| UserData | Reference to user data in managed memory |
| Timestamp | Local timestamp |
| IsQueued | Flag indicating whether media buffer object is queued in a media sender object or a media receiver object |

Figure 1:
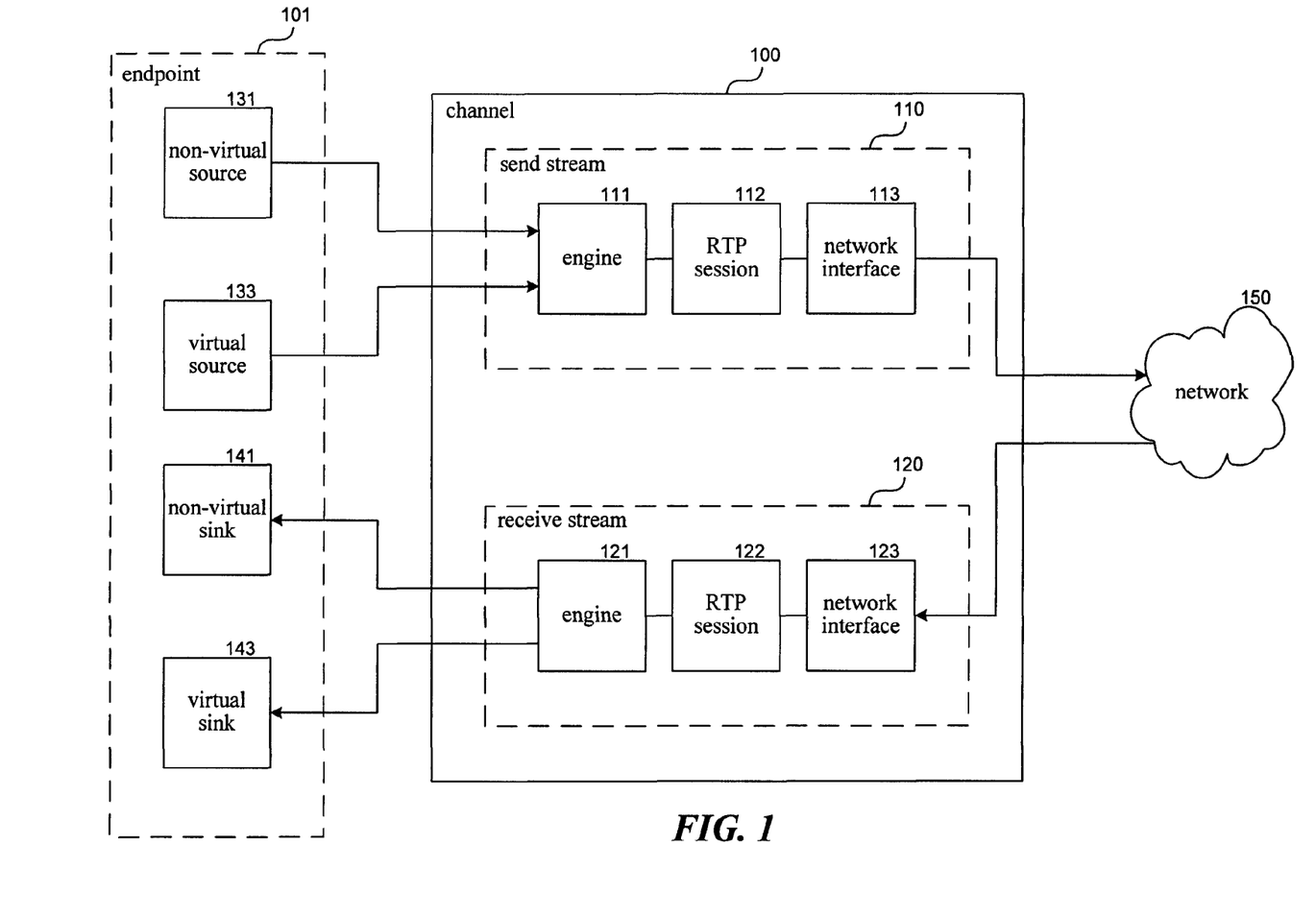
FIG. 1 is a block diagram that illustrates a channel connected to sources and sinks in one embodiment.

FIG. 1 is a block diagram that illustrates a channel connected to sources and sinks in one embodiment. Channel 100 includes a send stream 110 and a receive stream 120. Endpoint 101 is connected via channel 100 to a network 150 for sending messages to and receiving messages from another endpoint with sources and sinks that is connected via its own channel to the network. Endpoint 101 includes a non-virtual source 131 and a virtual source 133 connected to the send stream of channel 100 and includes a non-virtual sink 141 and a virtual sink 143 connected to the receive stream of channel 100. The virtual sources and virtual sinks represent media sender objects and media receiver objects. The send stream includes a source media stack with components that include engine 111, RTP session manager 112, and network interface 113. Network interface 113 is connected to network 150. The receive stream also includes a sink media stack with components that include engine 121, RTP session manager 122, and network interface 123. Network interface 123 is connected to network 150. Engine 111 is responsible for encoding/decoding of content to be sent via the stream from the sources and may perform other functions (e.g., when the content is audio, the engine may perform audio healing). For example, engine 111 may convert audio content in PCM format to G.722 format. Engine 111 then sends the content to RTP session manager 112. RTP session manager 112 implements the Real-Time Protocol and delivers messages complying with RTP to network interface 113 for transmission as packets via network 150 to the receiving endpoint. Network interface 123 receives from network 150 packets sent to endpoint 101. Network interface 123 provides messages to RTP session manager 122, which provides the content of the messages to engine 121. Engine 121 provides the content to non-virtual sink 141 and virtual sink 143 of endpoint 101. The implementation of a media stack may include a streaming engine that retrieves content from sources and provides the retrieved content to sinks. For example, the streaming engine may retrieve from a media sender object content provided by an application. The streaming engine may provide routing capabilities (e.g., have a cross bar) and format conversion capabilities. The streaming engine provides the content that is retrieved from the sources to the sinks. From the perspective of the streaming engine send streams and receive streams are just other instances of sources and sinks.

Figure 2:
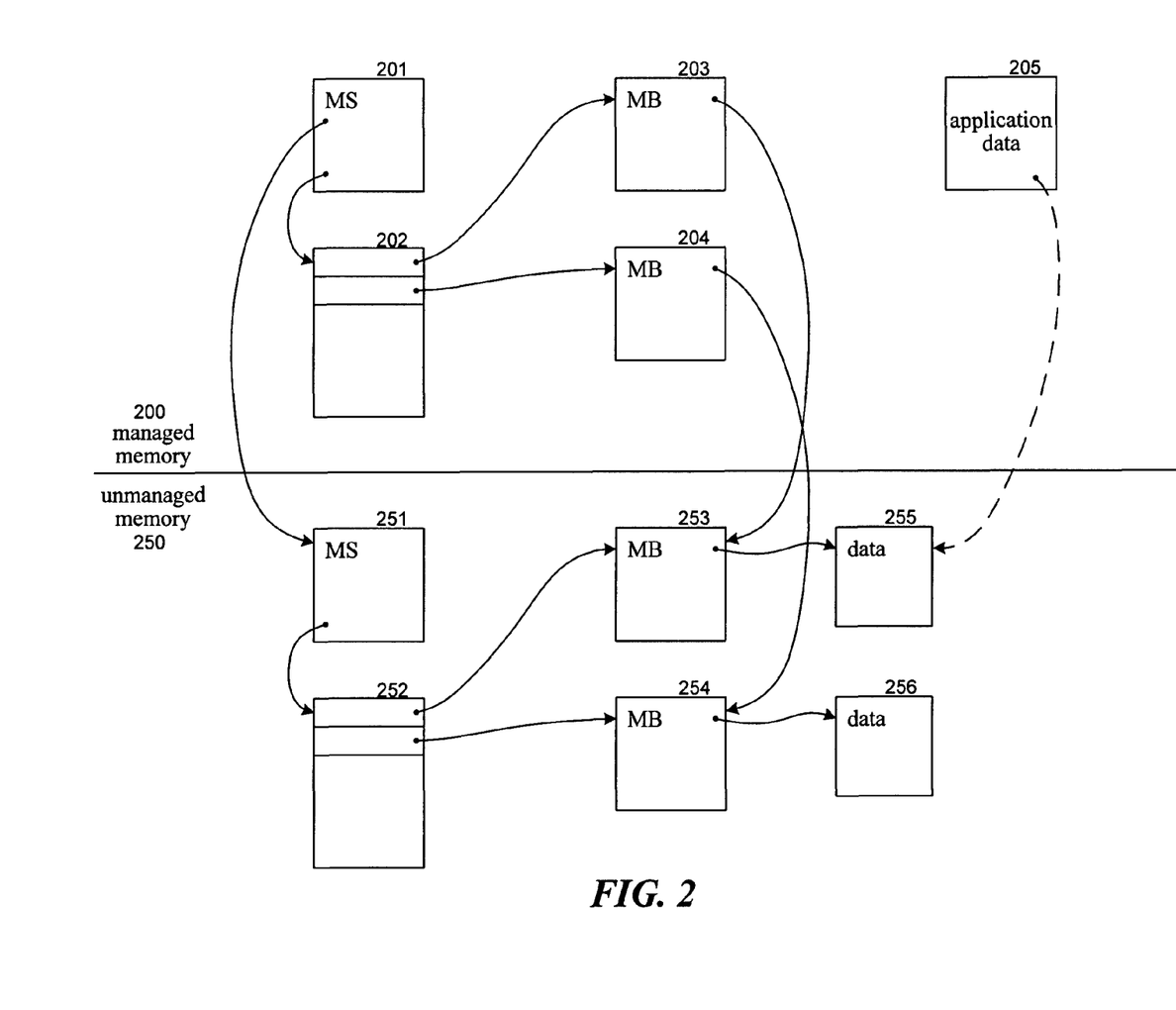
FIG. 2 is a block diagram that illustrates the instantiation of a media sender object and a media buffer object in one embodiment.

FIG. 2 is a block diagram that illustrates the instantiation of a media sender object and a media buffer object in one embodiment. The media sender object has components instantiated in a managed memory 200 and in an unmanaged memory 250. Managed memory, such as that provided by the .NET framework of MICROSOFT, provides high-level management functions to simplify development of applications. For example, managed memory provides for automatic garbage collection of buffers within managed memory. To support such garbage collection, the managed memory may use an indirect technique for referencing the buffers. Because the buffers are indirectly referenced by the applications, the garbage collection technique can move buffers around in managed memory without affecting the application. Although this technique helps improve memory management, some components, such as a media stack, access a buffer assuming that it is in unmanaged memory, rather than in managed memory. To allow applications that use managed memory to provide a virtual source or sink to interface with a media stack, the communications system maintains mirror media sender objects, media receiver objects, and media buffer objects in both managed memory and unmanaged memory. When an application instantiates a media sender object, media sender object 201 is instantiated in managed memory and media sender object 251 is instantiated in unmanaged memory. Media sender object 201 includes a reference to media sender object 251. Media sender object 201 instantiates a media queue 202 in managed memory, and media sender object 251 instantiates a media queue 252 in unmanaged memory. When an application instantiates a media buffer object, media buffer object 203 is instantiated in managed memory and media buffer object 253 is instantiated in unmanaged memory. Also, media buffer 255 is created in unmanaged memory. An application can use the methods of the media buffer object to copy application data in media buffer 205 from managed memory to a media buffer in unmanaged memory. When the application invokes the copy method of the media buffer object in managed memory, that method invokes a corresponding method of a media buffer object in unmanaged memory which performs the copy. When the application invokes the enqueue method of the media sender buffer in managed memory, that method adds the media buffer object of managed memory to the media queue in managed memory and that method also invokes a corresponding method in unmanaged memory. The enqueue method in unmanaged memory adds the media buffer in unmanaged memory to the media queue in unmanaged memory. The engine of the source media stack to which a media sender object is connected invokes a method of the media sender object in unmanaged memory to collect content that is to be sent.

The computing device on which the communications system is implemented may include a central processing unit, memory, input devices (e.g., keyboard and pointing devices), output devices (e.g., display devices), and storage devices (e.g., disk drives). The memory and storage devices are computer-readable media that may contain instructions that implement the communications system. In addition, the data structures and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the communications system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The communications system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
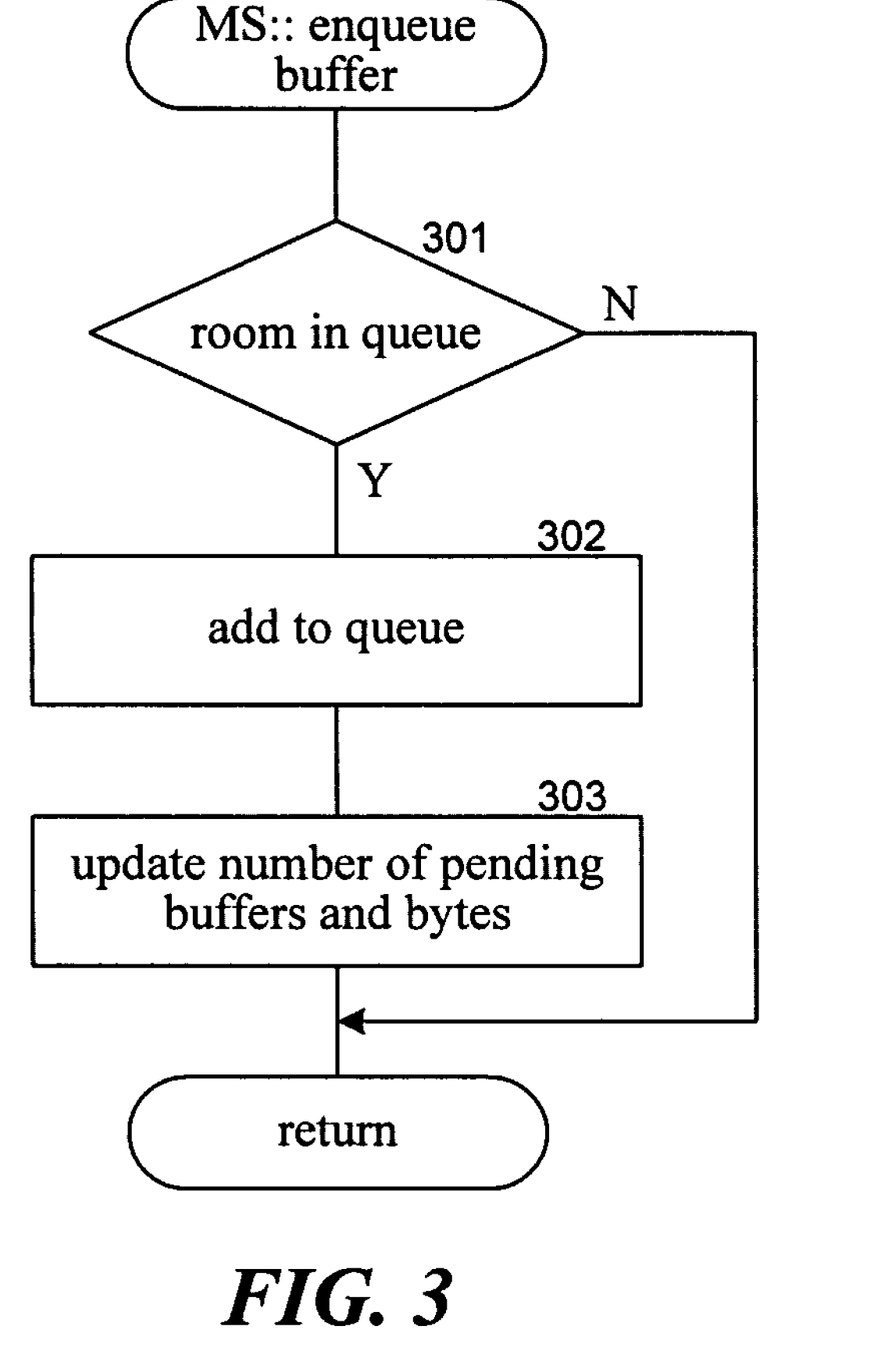
FIG. 3 is a flow diagram that illustrates the processing of the enqueue buffer component (or method) of the media sender object for unmanaged memory in one embodiment.

FIG. 3 is a flow diagram that illustrates the processing of the enqueue buffer component (or method) of the media sender object for unmanaged memory in one embodiment. The method adds the passed media buffer object to the media queue. In decision block 301, if there is room in the media queue, then the component continues at block 302, else the component returns. In block 302, the component adds the passed media buffer object to the media queue as pending. In block 303, the component updates the properties of the media sender object such as the number of pending buffers and bytes to account for the newly added media buffer object. Although not shown in FIG. 3, the component also determines whether a buffer threshold (e.g., total number of bytes in the buffers) has not been reached. If not reached, the component notifies the application via an event. For example, if the threshold is 2000 bytes and a buffer that is added to a previously empty queue contains only 1500 bytes, then the component notifies the application.

Figure 4:
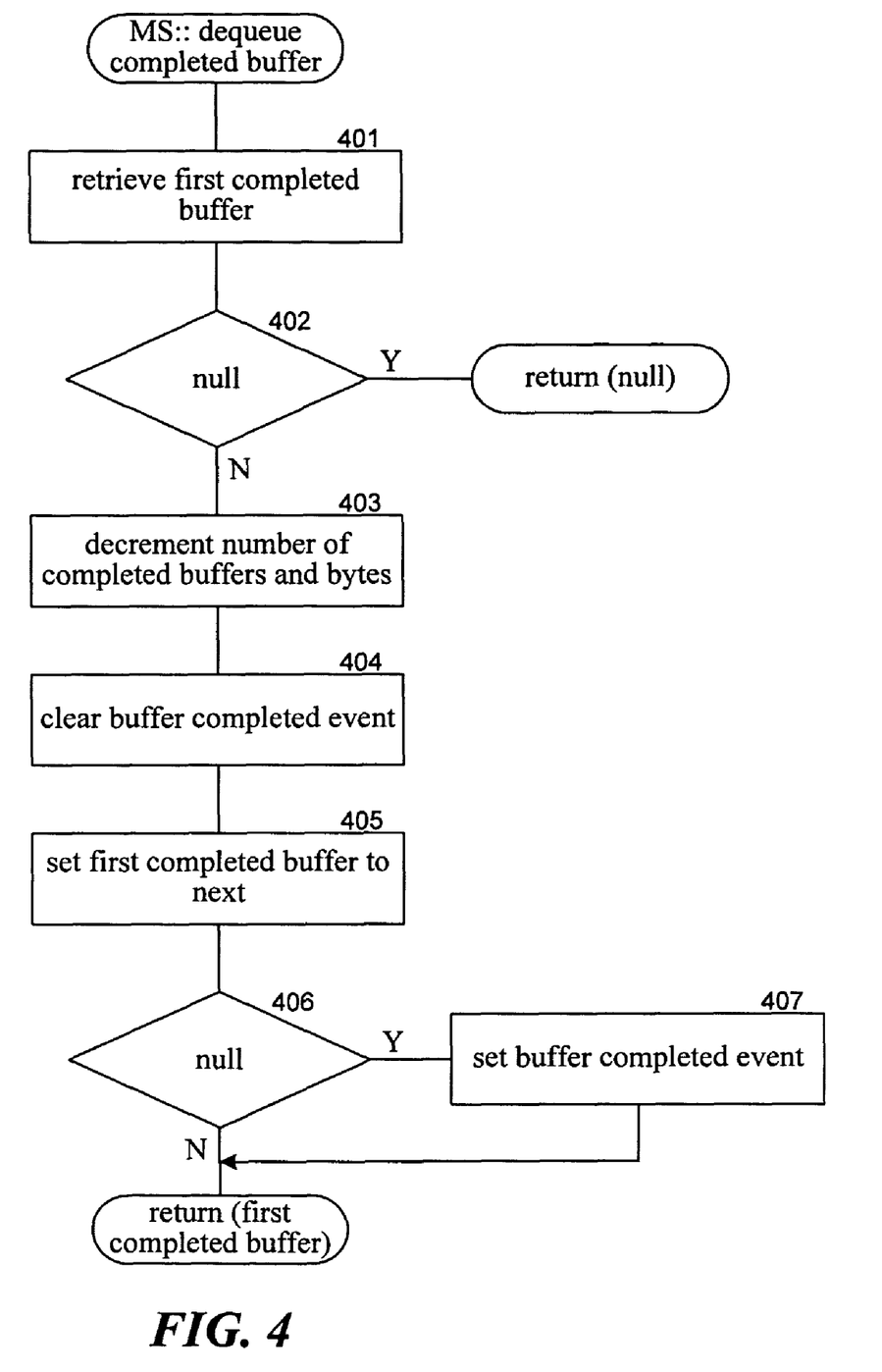
FIG. 4 is a flow diagram that illustrates the processing of the dequeue completed buffer component of the media sender object for unmanaged memory in one embodiment.

FIG. 4 is a flow diagram that illustrates the processing of the dequeue completed buffer component of the media sender object for unmanaged memory in one embodiment. The component is invoked by an application when the application has received a signal that the content of a media buffer object has been sent. In block 401, the component retrieves a reference to the first completed buffer of the media queue. In decision block 402, if the reference is null, indicating that there is no completed media buffer, then the component returns, else the component continues at block 403. In block 403, the component updates the properties of the media sender object such as the number of completed buffers and bytes to account for the newly removed media buffer object. In block 404, the component clears the buffer completed event flag. If there is another completed buffer, then the communications system will set or generate another event. In block 405, the component sets the reference to the first completed buffer to the next completed buffer. In decision block 406, if the reference to the first completed buffer is null, then the component continues at block 407, else the component returns a reference retrieved in block 401. In block 407, the component sets the buffer completed event and then returns the reference retrieved in block 401. Although not shown in FIG. 4, the component notifies the application via an event when the dequeueing of a buffer results in the queued buffers going below a buffer threshold (e.g., total number of bytes in the queued buffers).

Figure 5:
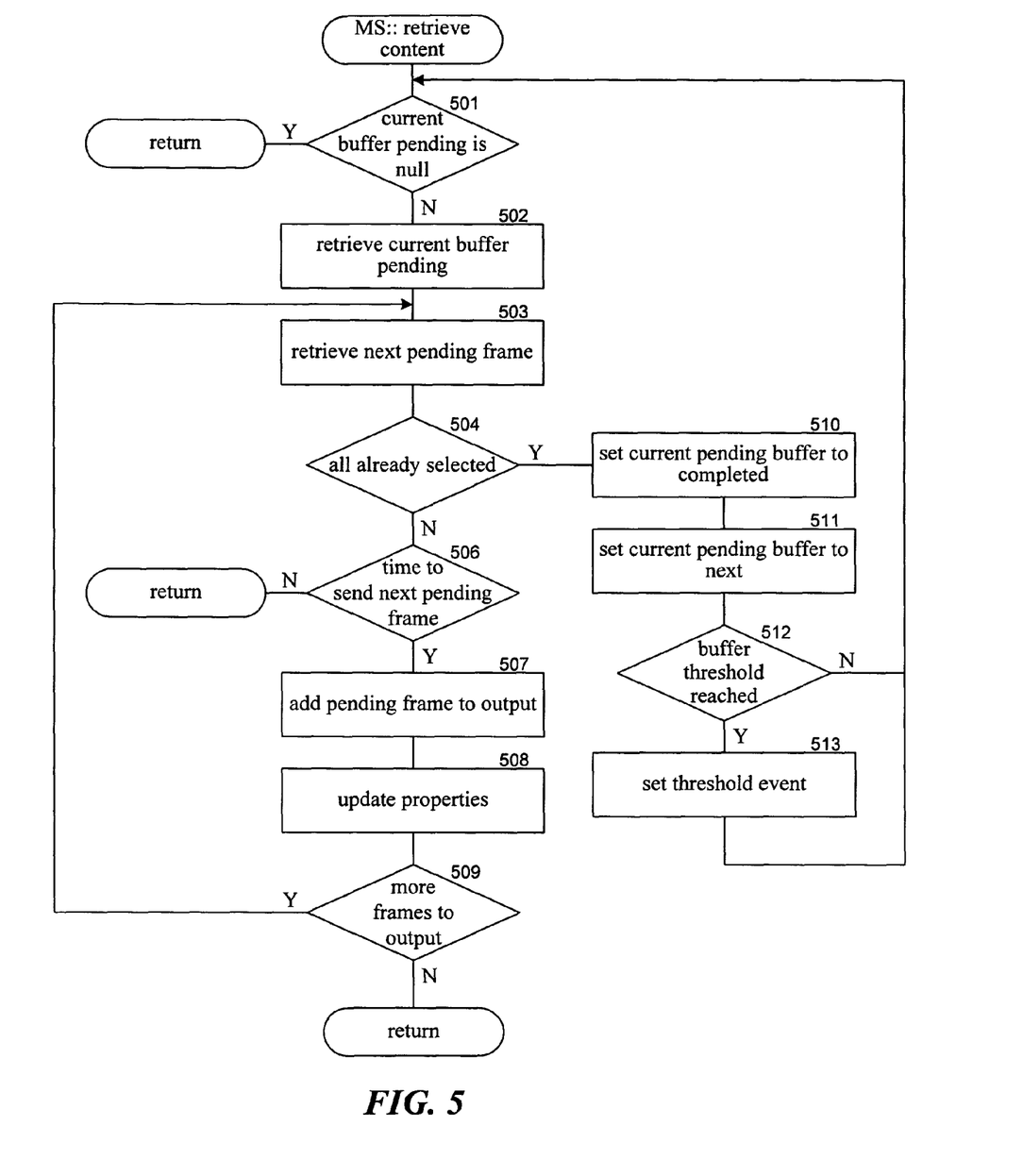
FIG. 5 is a flow diagram that illustrates the processing of the retrieve or get content component of the media sender object in one embodiment.

FIG. 5 is a flow diagram that illustrates the processing of the retrieve or get content component of the media sender object in one embodiment. The component is invoked by the engine of the source media stack to retrieve the next content to be sent. The component controls the timing of the sending of the content to the engine. In block 501, if the reference to the current pending buffer is null, indicating that there is no content to send, then the component returns, else the component continues at block 502. In block 502, the component retrieves the content of the current pending buffer. In decision blocks 503-509, the component loops retrieving the next frame of the current pending buffer and providing it to the source media stack assuming that the timing is appropriate. Although not shown in this figure, the component also determines whether the application-defined threshold of the application-defined threshold mode based on number of bytes (in the current buffer or in all buffers) or number of pending packets has been reached and generates an event as appropriate. In block 503, the component retrieves the next pending frame of the current pending buffer. In decision block 504, if all the pending frames of the current pending buffer have already been selected, then the component continues at block 510, else the component continues at block 506. In decision block 506, if it currently is the appropriate time to send the next pending frame, then the component continues at block 507, else the component returns. In block 507, the component adds the pending frame to the output to be returned to the source media stack. In block 508, the component updates the properties of the media sender object to reflect that the frame has been output and generates a remaining buffer or byte threshold event as appropriate. In decision block 509, if there are more frames in the current pending buffer or in additional pending buffers, then the component loops to block 503, else the component returns. In blocks 510-513, the component selects the next pending buffer. In block 510, the component sets the current pending buffer to completed and generates a buffer completed event assuming there is no buffer completed event for the media sender object outstanding. In block 511, the component sets the current pending buffer reference to the next pending buffer. In decision block 512, if the buffer threshold of the application-defined threshold mode has been reached, then the component continues at block 513, else the component loops to block 501 to process the next pending buffer. In block 513, the component generates a threshold event assuming one is not outstanding for the media sender object and then loops to block 501 to process the next pending buffer.

Figure 6:
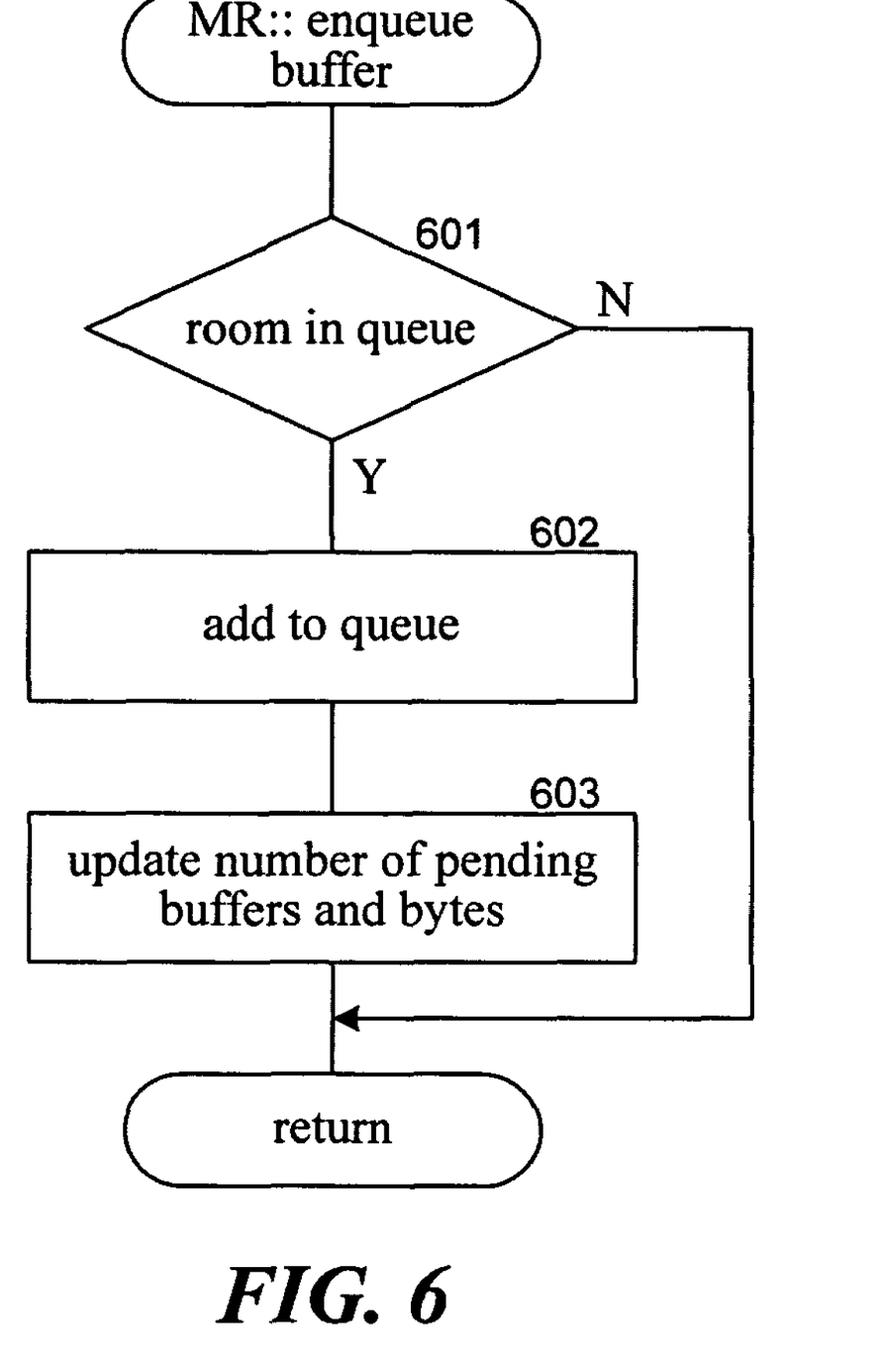
FIG. 6 is a flow diagram that illustrates the processing of the enqueue buffer component of the media receiver object in one embodiment.

FIG. 6 is a flow diagram that illustrates the processing of the enqueue buffer component of the media receiver object in one embodiment. The component is invoked by an application to add an empty media buffer object to the media queue for the media receiver object. In decision block 601, if there is room in the media queue, then the component continues at block 602, else the component returns. In block 602, the component adds the passed media buffer object to the media queue. In block 603, the component updates properties of the media receiver object such as number of pending buffers and bytes to reflect that the media buffer object has been added. The component then returns. Although not shown in FIG. 6, the component notifies the application via an event when a buffer added to the queue does not result in a threshold (e.g., number of bytes in the buffers) being exceeded.

Figure 7:
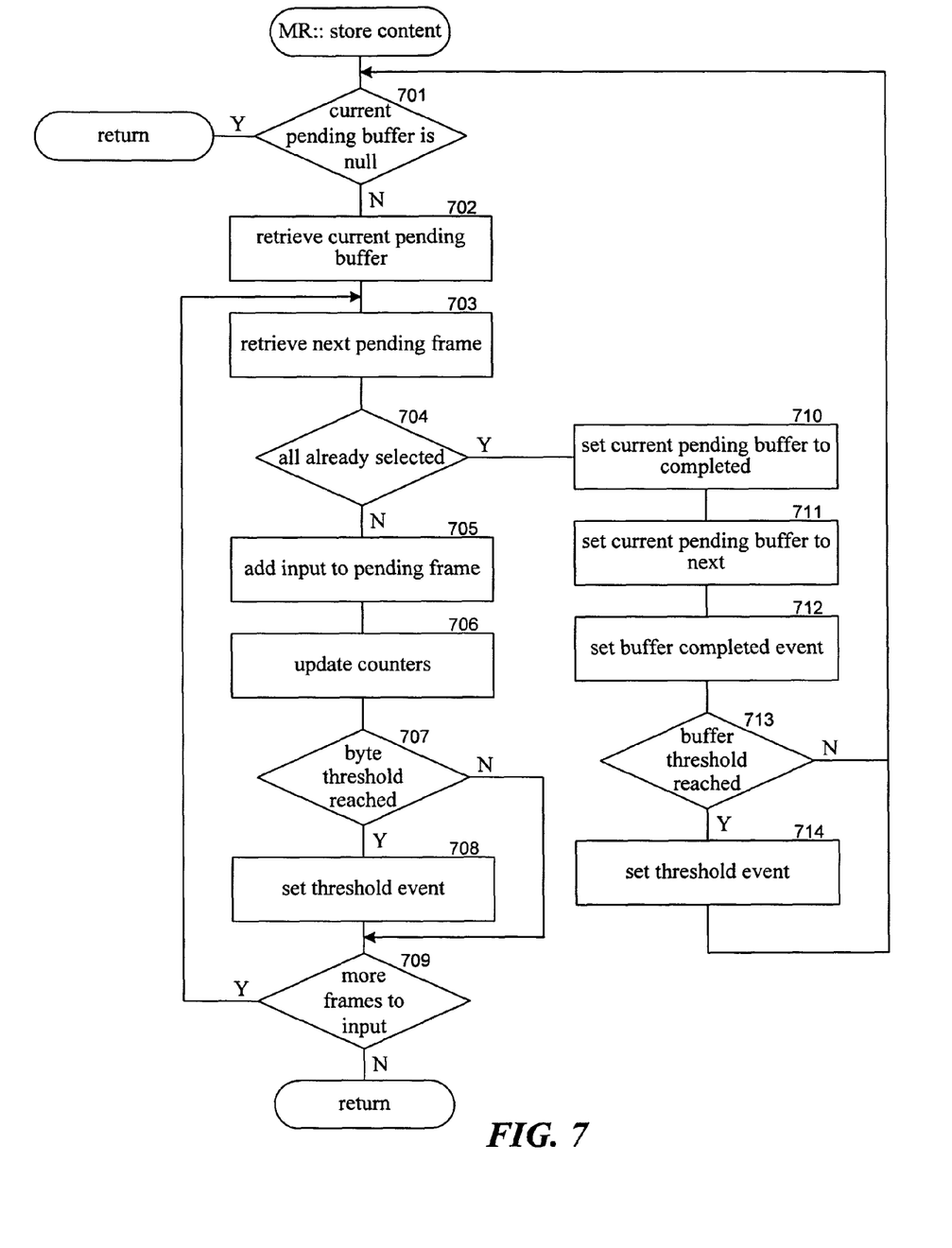
FIG. 7 is a flow diagram that illustrates the processing of the store or put content component of the media receiver object in one embodiment.

FIG. 7 is a flow diagram that illustrates the processing of the store or put content component of the media receiver object in one embodiment. The component is invoked by the engine of a sink media stack to store received content into a media buffer. In decision block 701, if the reference to the current pending buffer reference is null, then the component returns, else the component continues at block 702. In block 702, the component retrieves the current pending buffer. In blocks 703-709, the component loops storing content in pending frames of the current pending buffer. In block 703, the component retrieves the next pending frame. In decision block 704, if all the pending frames of the current pending buffer have already been selected, then the component continues at block 710, else the component continues at block 705. In block 705, the component adds input from the engine of the sink media stack to the retrieved pending frame. In block 706, the component updates the properties of the media receiver object to account for the received content. In decision block 707, if the byte threshold of the application-defined threshold has been reached, then the component continues at block 708, else the component continues at block 709. In block 708, the component generates a threshold event assuming one is not currently outstanding for the media receiver object. In decision block 709, if there are more frames of content to the input, then the component loops to block 703 to retrieve the next pending frame, else the component returns. In block 710-714, the component selects the next current pending buffer. In block 710, the component sets the current pending buffer to completed and updates the properties as appropriate. In block 712, the component sets the current pending buffer reference to the next pending buffer. In block 712, the component generates a buffer completed event assuming one is not outstanding for the media receiver object. In decision block 713, if the application-defined buffer threshold is reached, then the component continues at block 714, else the component loops to block 701 to process additional input. In block 714, the component generates a threshold event assuming one is not outstanding for the media receiver object and then loops to block 701 to process additional input.

From the foregoing, it will be appreciated that specific embodiments of the communications system have been described herein for purposes of illustration, but that various modifications may be made without deviating from the spirit and scope of the invention. In one embodiment, the media receiver object may provide metadata associated with a buffer to be transmitted. The metadata may be an array of structures with each structure corresponding to a certain amount of content (e.g., 10 milliseconds). When the content is audio, the structure may identify whether the content was modified by an audio healer (e.g., to perform error concealment or delay reduction in voice over IP), compressed, or stretched. The structure may also identify whether a frame contains concealed audio or comfort noise audio generated by an audio healer. Accordingly, the invention is not limited except as by the appended claims.

We claim:

1. A communications system for streaming content from a source to a sink, the communications system having managed and unmanaged memory, managed memory being memory that provides automatic garbage collection using indirect references to buffers to facilitate moving buffers without affecting an application that uses the buffers, unmanaged memory being memory that does not provide automatic garbage collection, comprising:

a channel including a send stream and a receive stream, the send stream for connecting to a source and a network and for sending content of the source to a destination sink via the network, the receive stream for connecting a sink to the network and for receiving content from an originating source via the network, the send stream including a send stream engine and the receive stream including a receive stream engine, the send stream engine and the receive stream engine for processing content stored in unmanaged memory;

a media sender object in managed memory for connecting to the send stream of the channel, the media sender object for receiving content from an application and providing the content to the send stream; the media sender object including a reference to an instantiated mirror media sender object in unmanaged memory, the media sender object providing an application interface for queueing buffers of content to be provided to the send stream;

a media receiver object in managed memory for connecting to the receive stream of the channel, the media receiver object for receiving content from the receive stream and providing the received content to an application; the media receiver object including a reference to an instantiated mirror media receiver object in unmanaged memory; and an application that registers the media sender object with the send stream of the channel and enqueues with the media sender object media buffers stored in managed memory and referencing content stored in managed memory to be sent by the media sender object wherein the enqueueing includes copying the content from managed memory to unmanaged memory and updating a reference in mirror media buffers stored in unmanaged memory to reference the content in unmanaged memory and that registers the media receiver object with the receive stream of the channel and enqueues with the media receiver object media buffers stored in managed memory and referencing a buffer in managed memory for storing content to be received by the media receiver object, wherein the enqueueing includes allocating a buffer in unmanaged memory for storing the content and updating a reference in mirror media buffers stored in unmanaged memory to reference the allocated buffer in unmanaged memory wherein the send stream engine invokes a retrieve content component of the mirror media sender object to retrieve a reference to the content stored in unmanaged memory from the mirror media buffers and returns the retrieved reference to the send stream engine for sending via the send stream, and wherein the receive stream engine invokes a store content component of the mirror media receiver object to store in unmanaged memory content in the mirror media buffers that was received by the receive stream engine via the receive stream and add a reference to the mirror media buffers to reference the stored content.

2. The communications system of claim 1 wherein the application is notified upon completion of the providing of the content of a buffer to the send stream.

3. The communications system of claim 1 wherein the application is notified when the amount of queued content is less than a threshold.

4. The communications system of claim 3 wherein the application defines the threshold.

5. The communications system of claim 1 wherein the media receiver object provides an application interface for queueing buffers for storing content to be provided by the receive stream.

6. The communications system of claim 5 wherein the application is notified upon completion of filling a buffer with content provided by the receive stream.

7. The communications system of claim 6 wherein the application is notified when remaining queued buffers represent less than a threshold amount of content.

8. The communications system of claim 7 wherein the application defines the threshold.

9. The communications system of claim 1 wherein the media sender object is a virtual source and the media receiver object is a virtual sink.

10. A computer-readable storage medium containing computer-executable instructions for controlling a computer to stream content from a source to a sink, the computer having managed and unmanaged memory, managed memory being memory that provides automatic garbage collection using indirect references to buffers to facilitate moving buffers without affecting an application that uses the buffers, unmanaged memory being memory that does not provide automatic garbage collection, the computer-executable instructions comprising instructions for:

a channel including a send stream and a receive stream, the send stream for connecting to a source and a network and for sending content of the source to a destination sink via the network, the receive stream for connecting a sink to the network and for receiving content from an originating source via the network, the send stream including a send stream engine and the receive stream including a receive stream engine, the send stream engine and the receive stream engine for processing content stored in unmanaged memory;

a media sender object of managed memory for connecting to the send stream of the channel, the media sender object for receiving content from an application and providing the content to the send stream; the media sender object including a reference to an instantiated mirror media sender object in unmanaged memory, the media sender object providing an application interface for queueing buffers of content to be provided to the send stream;

a media receiver object of managed memory for connecting to the receive stream of the channel, the media receiver object for receiving content from the receive stream and providing the received content to an application; the media receiver object including a reference to an instantiated mirror media receiver object in unmanaged memory; and an application that registers the media sender object with the send stream of the channel and enqueues with the media sender object media buffers stored in managed memory and referencing content stored in managed memory to be sent by the media sender object wherein the enqueueing includes copying the content from managed memory to unmanaged memory and updating a reference in mirror media buffers stored in unmanaged memory to reference the content in unmanaged memory and that registers the media receiver object with the receive stream of the channel and enqueues with the media receiver object media buffers stored in managed memory and referencing a buffer in managed memory for storing content to be received by the media receiver object, wherein the enqueueing includes allocating a buffer in unmanaged memory for storing the content and updating a reference in mirror media buffers stored in unmanaged memory to reference the allocated buffer in unmanaged memory wherein the send stream engine invokes a retrieve content component of the mirror media sender object to retrieve a reference to the content stored in unmanaged memory from the mirror media buffers and returns the retrieved reference to the send stream engine for sending via the send stream, and wherein the receive stream engine invokes a store content component of the mirror media receiver object to store in unmanaged memory content in the mirror media buffers that was received by the receive stream engine via the receive stream and add a reference to the mirror media buffers to reference the stored content.

11. The computer-readable storage medium of claim 10 wherein the application is notified upon completion of the providing of the content of a buffer to the send stream.

12. The computer-readable storage medium of claim 10 wherein the application is notified when the amount of queued content is less than a threshold.

13. The computer-readable storage medium of claim 12 wherein the application defines the threshold.

14. The computer-readable storage medium of claim 10 wherein the media receiver object provides an application interface for queueing buffers for storing content to be provided by the receive stream.

15. The computer-readable storage medium of claim 10 wherein the media sender object is a virtual source and the media receiver object is a virtual sink.

16. A method in a communications system for streaming content from a source to a sink, the communications system having managed and unmanaged memory, managed memory being memory that provides automatic garbage collection using indirect references to buffers to facilitate moving buffers without affecting an application that uses the buffers, unmanaged memory being memory that does not provide automatic garbage collection, the method comprising:

by a send stream of a channel,
connecting a source and a network; and
sending content of the source to a destination sink via the network, the send stream having a send stream engine for processing content stored in unmanaged memory;

by a receive stream of a channel,
connecting a sink to the network; and
receiving content from an originating source via the network, the receive stream having a receive stream engine for processing content stored in unmanaged memory;

by a media sender object in managed memory,
connecting to the send stream of the channel;
receiving content from an application;
providing the content to the send stream; and
providing an application interface for queueing buffers of content to be provided to the send stream, the media sender object including a reference to an instantiated mirror media sender object in unmanaged memory;

by a media receiver object in managed memory,
connecting to the receive stream of the channel;
receiving content from the receive stream; and
providing the received content to an application, the media receiver object including a reference to an instantiated mirror media receiver object in unmanaged memory; and by an application,
registering the media sender object with the send stream of the channel;
enqueueing with the media sender object media buffers stored in managed memory and referencing content stored in managed memory to be sent by the media sender object, wherein the enqueueing includes copying the content from managed memory to unmanaged memory and updating a reference in mirror media buffers stored in unmanaged memory to reference the content in unmanaged memory;
registering the media receiver object with the receive stream of the channel; and
enqueueing with the media receiver object media buffers stored in managed memory and referencing a buffer in managed memory for storing content to be received by the media receiver object, wherein the enqueueing includes allocating a buffer in unmanaged memory for storing the content and updating a reference in mirror media buffers stored in unmanaged memory to reference the allocated buffer in unmanaged memory wherein the send stream engine invokes a retrieve content component of the mirror media sender object to retrieve a reference to the content stored in unmanaged memory from the mirror media buffers and returns the retrieved reference to the send stream engine for sending via the send stream, and wherein the receive stream engine invokes a store content component of the mirror media receiver object to store in unmanaged memory content in the mirror media buffers that was received by the receive stream engine via the receive stream and add a reference to the mirror media buffers to reference the stored content.

17. The method of claim 16 wherein the application is notified upon completion of the providing of the content of a buffer to the send stream.

18. The method of claim 16 wherein the application is notified when the amount of queued content is less than a threshold.

19. The method of claim 16 wherein the media receiver object provides an application interface for queueing buffers for storing content to be provided by the receive stream.

* * * * *